US012601681B2

(12) United States Patent
Tani et al.

(10) Patent No.: US 12,601,681 B2
(45) Date of Patent: Apr. 14, 2026

(54) LASER SCATTERED LIGHT MEASURING DEVICE

(71) Applicant: YAMAMOTO KOGAKU CO., LTD., Higashiosaka (JP)

(72) Inventors: Yoshitaka Tani, Higashiosaka (JP); Kenta Noda, Higashiosaka (JP)

(73) Assignee: YAMAMOTO KOGAKU CO., LTD., Osaka (JP)

( * ) Notice: Subject to any disclaimer, the term of this patent is extended or adjusted under 35 U.S.C. 154(b) by 300 days.

(21) Appl. No.: 17/821,958

(22) Filed: Aug. 24, 2022

(65) Prior Publication Data

US 2023/0073495 A1     Mar. 9, 2023

(30) Foreign Application Priority Data

Sep. 9, 2021     (JP) ................................. 2021-146782

(51) Int. Cl.
  *G01N 21/47*     (2006.01)
  *G01J 1/42*     (2006.01)
  *G01J 1/44*     (2006.01)

(52) U.S. Cl.
  CPC ............ *G01N 21/47* (2013.01); *G01J 1/4257* (2013.01); *G01J 1/44* (2013.01); *G01J 2001/444* (2013.01)

(58) Field of Classification Search
  None
  See application file for complete search history.

(56) References Cited

U.S. PATENT DOCUMENTS

| | | | | |
|---|---|---|---|---|
| 2004/0010375 A1* | 1/2004 | Schomacker | .......... | G01N 21/31 702/19 |
| 2004/0207625 A1* | 10/2004 | Griffin | ................. | A61B 5/0059 345/629 |
| 2007/0045257 A1* | 3/2007 | Moor | ................... | B23K 26/702 219/121.86 |
| 2011/0270071 A1* | 11/2011 | Furukawa | ............ | A61B 5/0095 600/407 |
| 2015/0018807 A1* | 1/2015 | Kircher | ................. | A61B 18/02 606/12 |

(Continued)

FOREIGN PATENT DOCUMENTS

| | | |
|---|---|---|
| JP | S57-125327 A | 8/1982 |
| JP | S64-73226 A | 3/1989 |
| JP | H02-102750 U | 8/1990 |

(Continued)

*Primary Examiner* — Kara E. Geisel
*Assistant Examiner* — Chad Andrew Reverman
(74) *Attorney, Agent, or Firm* — Nicholas Mesiti, Esq.; Heslin Rothenberg Farley & Mesiti P.C.

(57)     ABSTRACT

Provided is a laser scattered light measuring device capable of easily confirming the safety of laser scattered light to a human body. The laser scattered light measuring device includes a light receiving unit, a calculation unit, and a display unit. The light receiving unit receives laser scattered light generated by irradiating an object with laser light and detects intensity of the laser scattered light. The calculation unit compares the intensity of the laser scattered light received by the light receiving unit with a predetermined threshold value and calculates a degree of risk of the laser scattered light to a human body based on a comparison result. The display unit displays the degree of risk calculated by the calculation unit.

13 Claims, 6 Drawing Sheets

(56)　　　　　　References Cited

U.S. PATENT DOCUMENTS

2019/0368927 A1 * 12/2019 Vakhshoori .......... G01J 3/0202

FOREIGN PATENT DOCUMENTS

| JP | H06-047807 U | 6/1994 | |
| JP | 09131320 A | 5/1997 | |
| JP | P2001-215284 A | 8/2001 | |
| JP | 2011229735 A | 11/2011 | |
| JP | 3193861 U | 10/2014 | |
| WO | WO-2012155125 A1 * | 11/2012 | .......... B23K 37/006 |

* cited by examiner

LASER SCATTERED LIGHT MEASURING DEVICE

CROSS REFERENCE TO RELATED APPLICATIONS

This application claims priority to Japanese Application No.: 2021-146782 filed on Sep. 9, 2021. The contents of this prior application is hereby incorporated by reference herein in its entirety.

BACKGROUND OF THE INVENTION

Field of the Invention

The present invention relates to a laser scattered light measuring device, and more particularly to a laser scattered light measuring device for confirming safety of laser scattered light on a human body.

Description of the Related Art

As a laser irradiation device that irradiates a human body with a laser for photoacoustic imaging, Japanese Patent Laid-Open No. 2011-229735 discloses a laser irradiation device including a laser light source, a detection unit, and a control unit. The detection unit detects irradiance of a laser to the human body. The control unit controls an output of the laser light source such that the irradiance of the laser detected by the detection unit does not exceed the maximum permissible exposure disclosed in JIS standard C6802 or the like. As the control unit controls the output of the laser light source such that the irradiance of the laser does not exceed the maximum permissible exposure, the safety of the laser light to the human body is secured.

However, according to the laser irradiation device disclosed in Japanese Patent Laid-Open No. 2011-229735, even when the irradiance of the laser light directly irradiated to the human body can be controlled so as not to be harmful to the human body, scattered light cannot be controlled so as not to be harmful to the human body when a laser is used for cutting or drilling of a metal material, for example.

The present invention has been made in view of the above problems, and is to provide a laser scattered light measuring device capable of easily confirming the safety of laser scattered light to a human body.

SUMMARY OF THE INVENTION

A laser scattered light measuring device disclosed in the present application invention includes a light receiving unit, a calculation unit, and a display unit. The light receiving unit receives laser scattered light generated by irradiating an object with laser light and detects intensity of the laser scattered light. The calculation unit compares the intensity of the laser scattered light detected by the light receiving unit with a predetermined threshold value and calculates a degree of risk of the laser scattered light to a human body based on a comparison result. The display unit displays the degree of risk calculated by the calculation unit.

The laser scattered light measuring device disclosed in the present application invention further includes a laser pointer. The laser pointer points to a generation position in the object of the laser scattered light received by the light receiving unit.

The laser scattered light measuring device disclosed in the present application invention further includes an alarm unit.

The alarm unit issues an alarm sound when the degree of risk is equal to or more than a reference value determined based on the threshold value.

The laser scattered light measuring device disclosed in the present application invention further includes maximum value recording means. The maximum value recording means records a maximum value of the intensity of the laser scattered light detected by the light receiving unit. Then, the display unit displays a change in the degree of risk in real time and continuously displays the degree of risk corresponding to the maximum value.

In the laser scattered light measuring device disclosed in the present application invention, the light receiving unit includes a lens, a light dimming unit, and a light sensor. The lens concentrates the laser scattered light. The light dimming unit adjusts a frequency component of light transmitting through the lens. The light sensor outputs a light intensity signal corresponding to irradiance of light transmitting through the light dimming unit to the calculation unit.

According to the laser scattered light measuring device of the present invention, it is possible to easily confirm the safety of the laser scattered light to the human body.

DETAILED DESCRIPTION OF THE PREFERRED EMBODIMENT

Hereinafter, a laser scattered light measuring device according to an embodiment of the present invention will be described in detail with reference to the drawings. Since the embodiment described below is a preferred specific example for carrying out the present invention, various technical restrictions are made, but it is assumed that the present invention is not limited to the following embodiment unless otherwise described to limit the invention in the following description.

Embodiment

Figure 1:
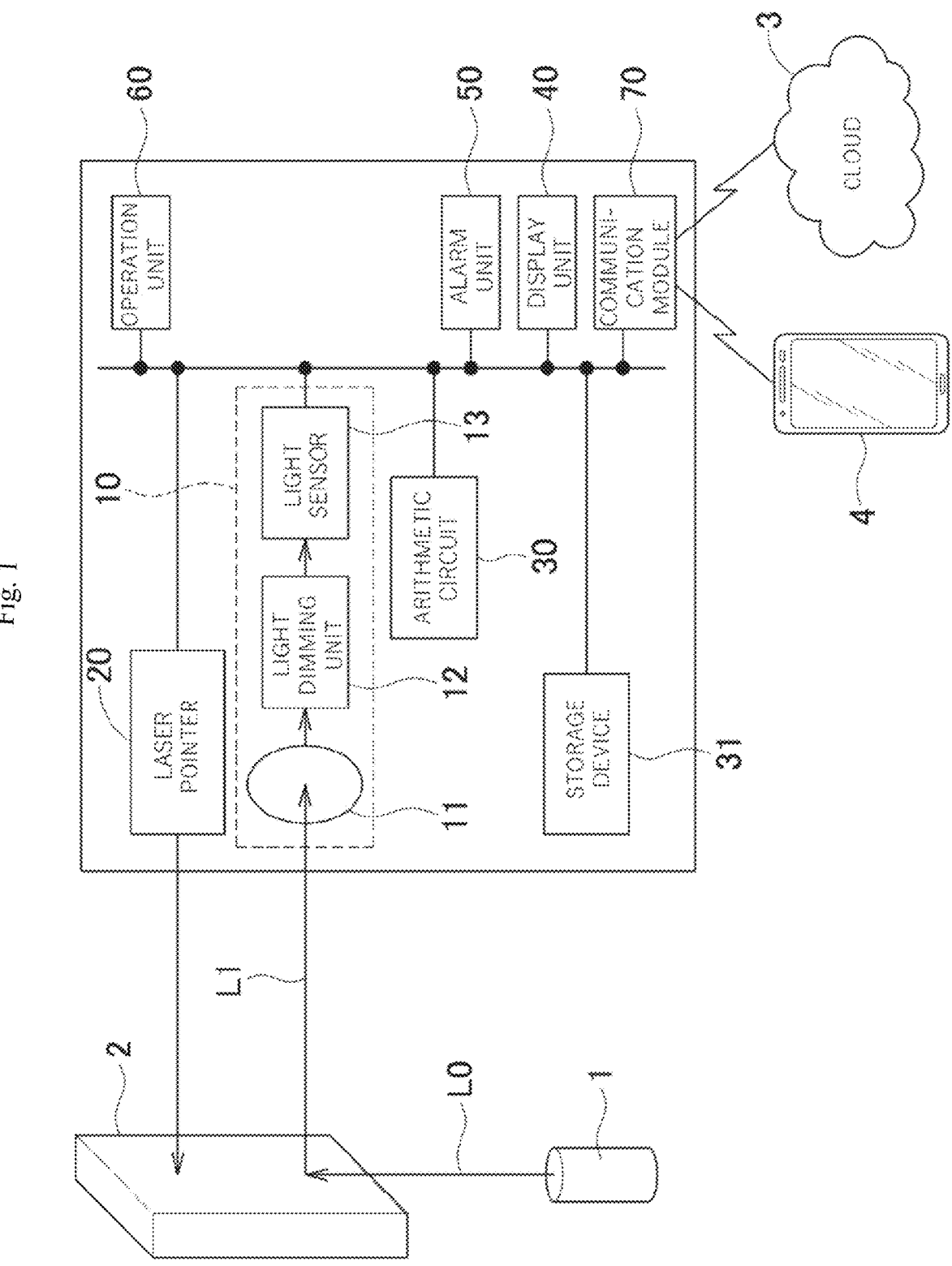
FIG. 1 is a functional block diagram showing a laser scattered light measuring device according to an embodiment of the present invention.
Figure 2:
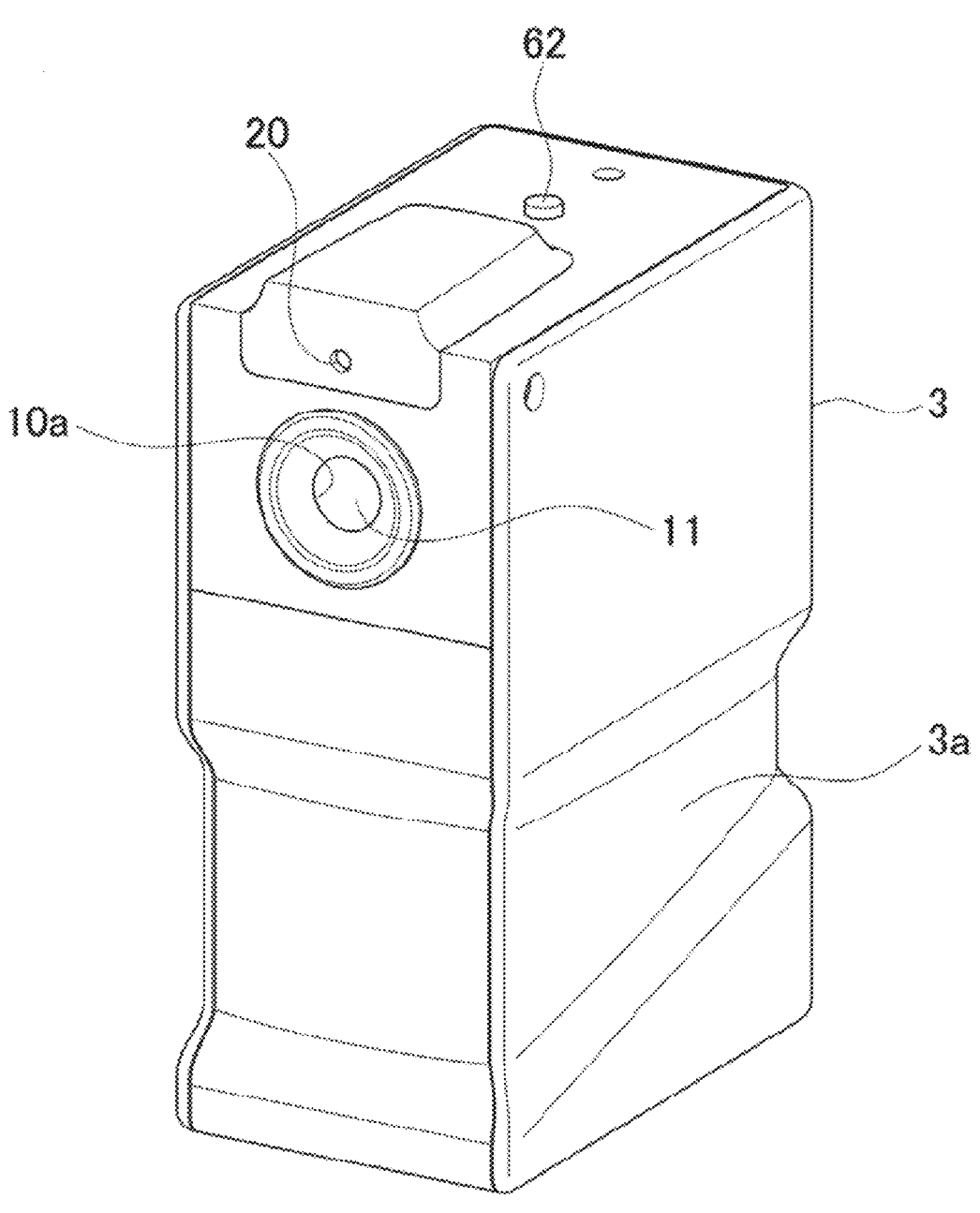
FIG. 2 is a front perspective view showing the laser scattered light measuring device according to the embodiment of the present invention.
Figure 3:
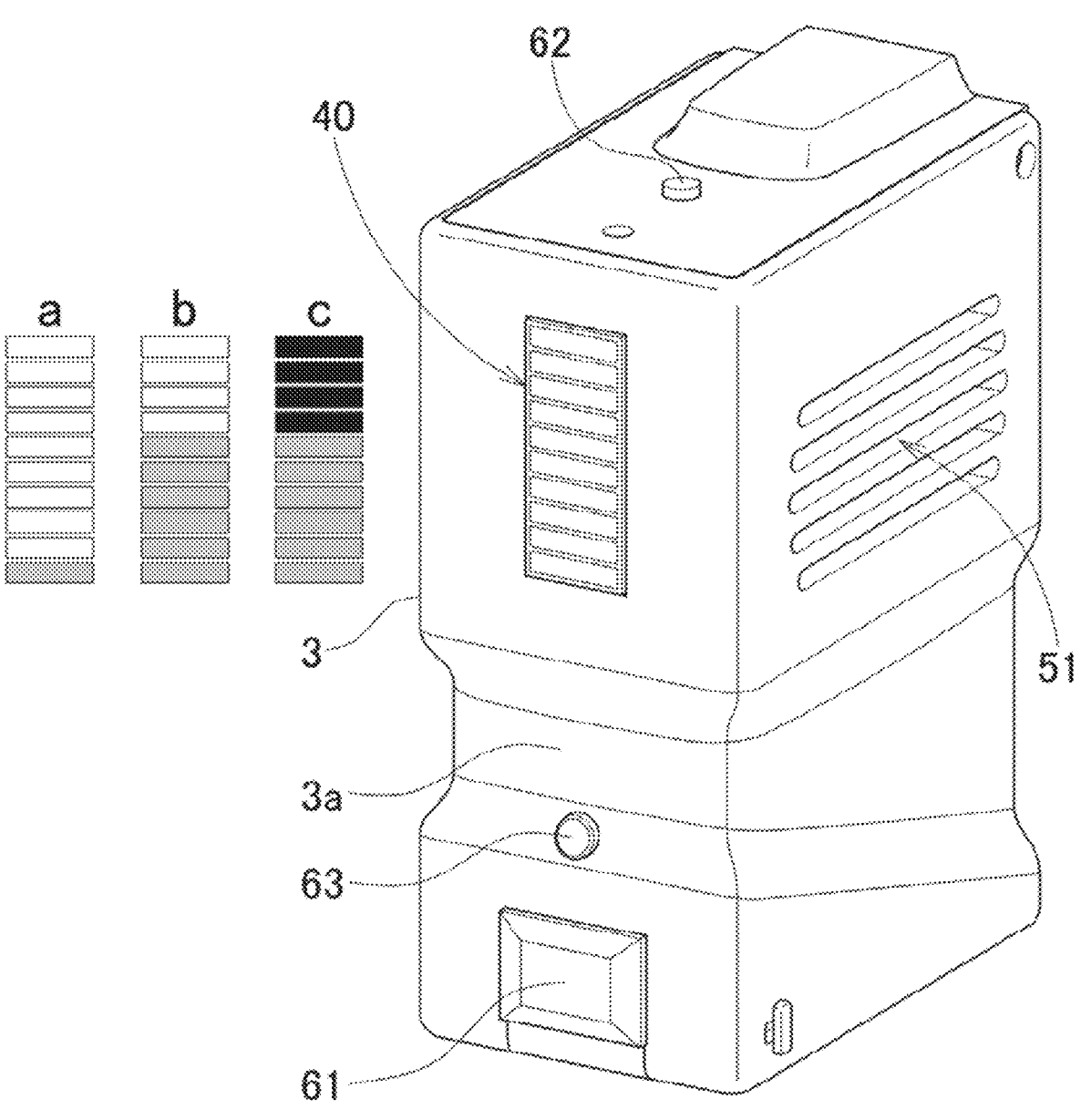
FIG. 3 is a rear perspective view showing the laser scattered light measuring device according to the embodiment of the present invention.

Hereinafter, a laser scattered light measuring device of an embodiment of the present invention will be described FIGS. 1 to 3. FIG. 1 is a functional block diagram showing a laser scattered light measuring device according to the present embodiment. FIG. 2 is a front perspective view showing the laser scattered light measuring device according to the present embodiment. FIG. 3 is a rear perspective view showing the laser scattered light measuring device according to the present embodiment.

As shown in FIGS. 1 to 3, the laser scattered light measuring device of the embodiment is used to measure intensity of laser scattered light L1 generated when a laser device 1 irradiates an object such as a workpiece 2 with laser light L0, and includes a light receiving unit 10, a laser pointer 20, processing circuit 30 as an arithmetic calculation unit, a display unit 40, an alarm unit 50, an operation unit 60, and a communication module 70 as communication means. The respective units of the measuring device are connected to each other via a bus. The respective units of the measuring device may be connected in one-to-one relation to each other.

As shown in FIGS. 2 and 3, the measuring device includes a housing 3. The housing 3 houses the light receiving unit 10, the laser pointer 20, the processing circuit 30, the display unit 40, the alarm unit 50, the operation unit 60, and the communication module 70. In the embodiment, a size of the housing 3 is set to a size enough to be held by one hand in order to facilitate the handling of the measuring device. For example, a height of the housing 3 is set to about 10 cm. Further, the housing 3 includes a recess 3a having a shape that allows a finger to be hung when the measuring device is gripped with one hand.

The measuring device of the present embodiment typically uses the laser device 1 such as a CW-YAG laser capable of continuously oscillating the laser light L0, and is used to confirm the safety of the laser scattered light L1 to the human body in various situations where an appropriate distance is taken from the generation position of the laser scattered light L1 or an appropriate shield is installed between a person and the generation position of the laser scattered light L1, in order to secure an area where a person can safely come and go in a workplace where welding or cutting of the workpiece 2 of a metal material is performed The light receiving unit 10 includes a lens 11, a light dimming unit 12, and a light sensor 13, and receives the laser scattered light L1 generated by irradiation of the laser light L0 onto the object such as the workpiece 2 to detect intensity of the laser scattered light L1. The intensity of the laser scattered light L1 can be expressed by irradiance, which is a value obtained by dividing radiant flux incident on a bare surface by an area of the bare surface. The unit of irradiance is "watt per square meter (W/m2)". In addition, the laser scattered light L1 is typically generated by reflection and/or diffusion of the laser light L0 on the object such as the workpiece 2.

The lens 11 concentrates the laser scattered light L1 that enters through a light receiving opening 10a provided in the housing 3. In the embodiment, the light receiving opening 10a has a circular shape, and has a diameter that is set to 7 mm in conformity with Annex "A. 2 Limiting aperture" of JIS standard C6802.

The light dimming unit 12 adjusts a frequency component of the light transmitted through the lens 11 so as to selectively transmit a frequency component of a specific frequency band determined based on a wavelength of the laser light L0 irradiated to the workpiece 2, for example. The light dimming unit 12 is formed by using at least one of an optical filter, a polarizing plate, a wave plate, a wavelength conversion material (wavelength conversion element) such as a non-linear crystal, a diffusion plate, and a diffraction plate, for example. As the optical filter, a reflection filter and an absorption filter can be used.

As the reflection filter and the absorption filter, a bandpass filter, a shortwave-pass filter, a longwave-pass filter, and a dimming filter (ND filter) can be used, for example.

When the laser device 1 is a CW-YAG laser, the wavelength of the laser light L0 is 1064 nm, and the light dimming unit 12 adopts a bandpass filter that selectively transmit a frequency component of a frequency band determined based on the wavelength of 1064 nm.

In the embodiment, the light sensor 13 is formed of a CMOS (CMOS: Complementary Metal Oxide Semiconductor) image sensor, a CCD (CCD: Charge Coupled Device) image sensor, and a photoelectric effect type sensor such as phototransistor, and outputs a light intensity signal which is an electric signal corresponding to the intensity of the light transmitted through the light dimming unit 12.

The laser pointer 20 points to a position where the laser scattered light L1 received by the light receiving unit 10 is generated in the workpiece 2. The laser light L0 has strong directivity, and at the time of detecting the intensity of the laser scattered light L1, it is necessary to determined position and posture of the measuring device such that the lens 11 faces correctly the generation position of the laser scattered light L1. Since the measuring device of the embodiment includes the laser pointer 20, the light receiving unit 10 can receive the laser scattered light L1 in the state where the lens 11 faces correctly the generation position of the laser scattered light L1, and the intensity of the laser scattered light L1 can be detected accurately.

The processing circuit 30 as the arithmetic calculation unit compares irradiance L1, which is the intensity of the laser scattered light L1 received by the light receiving unit 10, with a threshold value R0 which is a predetermined threshold value, and calculates a degree of risk D of the laser scattered light L1 to the human body based on the comparison result. Further, the processing circuit 30 serves as a critical control unit to control the respective units, for example, the laser pointer 20, the display unit 40, the alarm unit 50, and the communication module 70.

In the embodiment, the threshold value R0 is a numerical value corresponding to the maximum permissible exposure disclosed in Annex A of JIS standard C6802, and is stored in a storage device 31. The maximum permissible exposure varies depending on the wavelength of the laser light L0, and is indicated by irradiance or radiant exposure in Annex A. When the laser device 1 is a CW-YAG laser and the wavelength of the laser light L0 is 1064 nm, the maximum permissible exposure is 50 W/m2 as a reference value, and the numerical value corresponding to the irradiance is used as the threshold value R0.

In the embodiment, the degree of risk D is calculated based on a ratio of the irradiance I1 to the threshold value R0. For example, when the irradiance I1 is 100% or more of the threshold value R0, the degree of risk D is set to a value "10", and when the irradiance I1 is 90% or more and less than 100% of the threshold value R0, the degree of risk D is set to a value "9". In this way, the degree of risk D is calculated based on a ratio of the irradiance I1 to the threshold value R0 in the embodiment.

The display unit 40 displays the degree of risk D calculated by the processing circuit 30. As shown in FIG. 3, in the embodiment, the display unit 40 is a 10-step level meter, and each step corresponds to the value of the degree of risk D. In the embodiment, when the degree of risk D is a value "1", the ratio of the irradiance I1 to the threshold value R0 is equal to or more than a predetermined lower limit ratio LR and less than 20%, and when the degree of risk D is a value "2", the ratio is equal to or more than 20% and less than 30%. Thereafter, upper and lower limits of the ratio increase by 10%.

In the embodiment, the lower limit ratio LR is set to a predetermined ratio that is greater than 0% and less than 10%. Further, the display unit 40 is not limited to the level meter, and may display, for example, the degree of risk D as a numerical value on a liquid crystal panel as long as the degree of risk D can be visually recognized.

The alarm unit 50 issues an alarm sound when the degree of risk D is equal to or more than a reference value R1. The reference value R1 is determined based on the threshold value R0. As shown in FIG. 3, the alarm unit 50 includes a speaker 51 in the embodiment. In the embodiment, the reference value R1 is set to a value "10" of the degree of risk D when the ratio of the irradiance I1 to the threshold value R0 is 100% or more, and the alarm unit 50 issues an alarm sound from the speaker 51 when the ratio of the irradiance I1 to the threshold value R0 is 100% or more. In the embodiment, the processing circuit 30 controls the display unit 40 such that the display on the display unit 40 blinks at the same time as the speaker 51 generates the alarm sound, and thus the alarm unit 50 issues that the degree of risk D is equal to or more than the reference value R1.

As shown in FIGS. 2 and 3, the operation unit 60 includes a power switch 61, a calibration switch 62, and a laser pointer switch 63 in the embodiment. The power switch 61 turns on/off the power of the measuring device. The calibration switch 62 instructs the processing circuit 30 to execute the calibration. The laser pointer switch 63 instructs the processing circuit 30 to emit the laser pointer 20. The function of each of the switches will be described with reference to FIGS. 4 to 6 as necessary.

As shown in FIG. 1, the communication module 70 communicates with external storage means such as a cloud 3 or a terminal device 4 such as a smartphone, a tablet, and a personal computer in the embodiment, and transmits various data to the external storage means such as the cloud 3 or the terminal device 4, the various data indicating the irradiance I1 at each point of time, the degree of risk D, the maximum value of the irradiance I1 described below with reference to FIG. 6, the maximum degree of risk D corresponding to the maximum value of the irradiance I1, and whether there is a risk state in which the maximum degree of risk D is equal to or more than the reference value R1.

The external storage means such as the cloud 3 stores and retains the data transmitted by the communication module 70. The terminal device 4 displays the data transmitted by the communication module 70 on a display device such as a liquid crystal panel or a monitor, using a dedicated application or software. Similarly to the display unit 40, as a form in which the terminal device 4 displays the data transmitted by the communication module 70 on the display device, for example, the terminal device 4 may display a level meter on a liquid crystal panel, or may directly display each data, for example, the degree of risk D in characters or numerical values.

In the example shown in FIG. 1, the communication module 70 wirelessly communicates with the external storage means such as the cloud 3 and the terminal device 4, but may be connected with the external storage means such as the cloud 3 and the terminal device 4 in a wired manner via, for example, a universal serial bus (USB) terminal or a wired local area network (LAN). Further, the external storage means is not limited to the cloud 3, and may be a universal serial bus (USB) memory or an SD memory card.

Further, the communication module 70 may transmit the various data described above to the laser device 1, and the laser device 1 may include control means that controls the intensity of the laser light L0 irradiated onto the object, based on the data transmitted by the communication module 70. For example, when there is a risk state in which the maximum degree of risk D is equal to or more than the reference value R1, it is conceivable that the control means controls the laser device 1 so as to stop the oscillation of the laser light L0 or to reduce the intensity of the laser light L0 to be irradiated.

Figure 4:
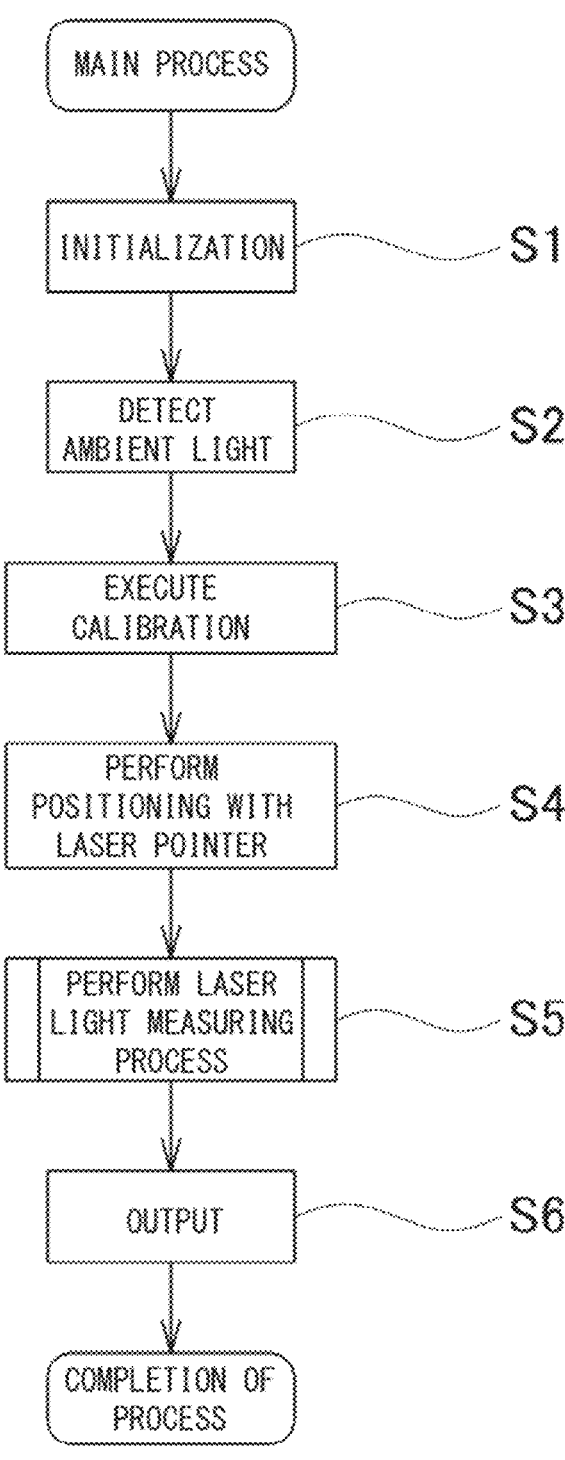
FIG. 4 is a flowchart showing a main process in the laser scattered light measuring device according to the embodiment of the present invention.
Figure 5:
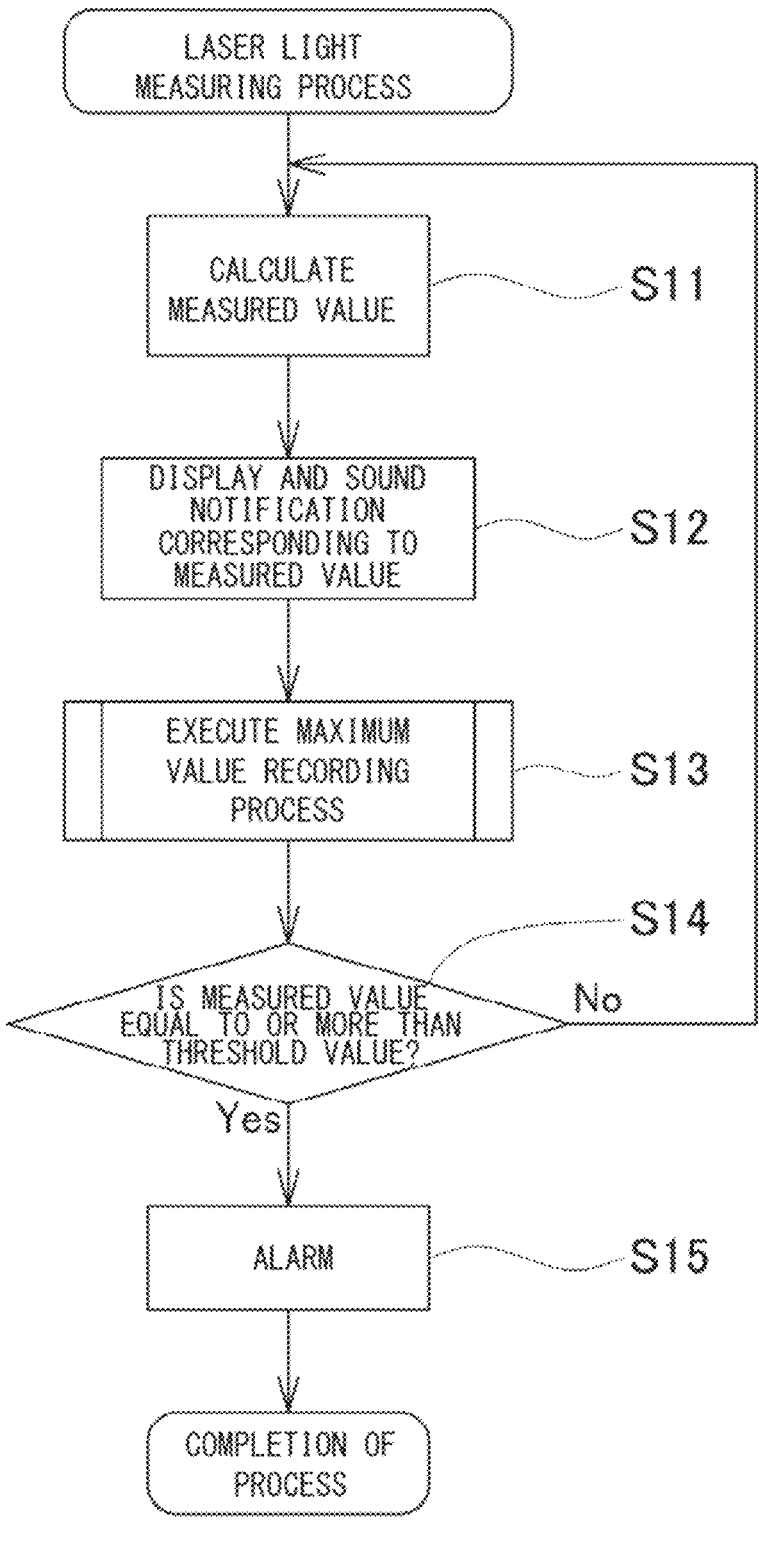
FIG. 5 is a flowchart showing a laser light measuring process in the laser scattered light measuring device according to the embodiment of the present invention.

Next, an operation of the measuring device according to the embodiment will be described with reference to FIGS. 1 to 3 and FIGS. 4 to 6. FIG. 4 is a flowchart showing a main process in the laser scattered light measuring device according to the embodiment. FIG. 5 is a flowchart showing a laser light measuring process in the laser scattered light measuring device according to the embodiment. FIG. 6 is a flowchart showing a maximum value recording process in the laser scattered light measuring device according to the embodiment.

In step S1 of the main process shown in FIG. 4, the power switch 61 is switched from "off" to "on", power is supplied from a power device such as a battery (not shown) to each unit of the measuring device, and a predetermined initialization process is performed. When the initialization process is completed, detection of intensity of light incident on the light receiving unit 10 is started. In the initialization process, various processes such as reading of the threshold value R0 from the storage device 31 to the processing circuit 30 are performed.

In step S2 of the main process shown in FIG. 4, an ambient light detecting process is performed to execute calibration, which is zero point setting. In order to eliminate the influence of ambient light such as indoor fluorescent lamp light and outdoor sunlight on the detection result in the light receiving unit 10, the power switch 61 is switched from "off" to "on" in the ambient light detecting process, and when the light receiving unit 10 starts detecting the intensity of light, the light sensor 13 outputs a light intensity signal as a zero point.

In step S3 of the main process shown in FIG. 4, a calibration process is executed. The processing circuit 30 controls the storage device 31 such that the light intensity signal output by the light sensor 13 in step S2 is stored as a zero point. The light intensity signal stored in the storage device 31 as a zero point is used in the subsequent laser light measuring process.

The calibration process in step S3 is executed frequently even when the calibration switch 62 is operated. Since the calibration process is executed frequently, even when measurement environment of the laser scattered light changes during measurement work, it is possible to reset the zero point to a more appropriate value and to eliminate the influence of ambient light on the measurement result of the laser scattered light more appropriately.

In step S4 of the main process shown in FIG. 4, positioning is performed by the laser pointer 20. A measurer points to the position where he/she considers that the most powerful laser scattered light is generated, for example, the position where the laser light L0 hits the workpiece 2 with the laser pointer 20, and determines the position where he/she considers that the most powerful laser scattered light is generated, as a measurement target position of the laser scattered light L1.

In step S5 of the main process shown in FIG. 4, a laser light measuring process is performed. The laser light measuring process will be described below with reference to FIG. 5. In the process of FIG. 5, for example, while the power switch 61 is switched "on", processes of steps S11 to S15 are repeatedly executed.

In step S11 of the laser light measuring process shown in FIG. 5, a measured value calculating process is performed. In the measured value calculating process, the processing circuit 30 calculates the irradiance I1, which is the intensity of the laser scattered light L1 at each time point, based on a difference between a light intensity signal V1 output by the light sensor 13 at each time point and the zero point set in step S3 of FIG. 4.

In step S12 of the laser light measuring process shown in FIG. 5, the processing circuit 30 calculates a degree of risk D based on the irradiance I1 calculated in step S11, and controls the display unit 40 to display the calculated degree of risk D. Further, the processing circuit 30 controls the alarm unit 50 to issue an alarm sound when the degree of risk D is a value "10".

FIG. 3 shows a display example a, a display example b, and a display example c of the degree of risk D on the display unit 40. The display example a is a display example when the degree of risk D is a value "1", the display example b is a display example when the degree of risk D is a value "6", and the display example c is a display example when the degree of risk D is a value "10". In the example shown in FIG. 3, in order to show that the irradiance I1 is about to reach the maximum permissible exposure, when the degree of risk D is a value "7" or more, for example, a display mode is changed in which a display color is different from that when the degree of risk D is a value "6" or less. The value of the degree of risk D which is a boundary when the display mode is change can be changed, and also the display mode can be kept unchanged.

In step S13 of the laser light measuring process shown in FIG. 5, a maximum value recording process is executed as maximum value recording means. In the maximum value recording process, for example, the maximum value of the irradiance I1 calculated in step S11 is recorded until the power switch 61 is switched from "on" to "off". Details of the maximum value recording process will be described with reference to FIG. 6.

In step S14 of the laser light measuring process shown in FIG. 5, it is determined whether the irradiance I1 calculated at each time point is equal to or more than the threshold value R0. When the irradiance I1 at each time point is equal to or more than the threshold value R0 (Yes), the process proceeds to step S15, and when the irradiance I1 is less than the threshold value R0 (No), the process returns to step S11.

In step S15 of the laser light measuring process shown in FIG. 5, the processing circuit 30 controls the alarm unit 50 to issue an alarm sound. In the embodiment, the processing circuit 30 controls the alarm unit 50 so that the speaker 51 issues an alarm sound indicating an abnormality, for example, issues intermittent sound of a rapid pitch. Further, the processing circuit 30 can also cause an alarm to be issued by controlling the display unit 40 to blink.

Returning to FIG. 4, in step S6 of the main process, the display unit 40 displays the change in the degree of risk D in real time and continuously displays the degree of risk D corresponding to the maximum value of the irradiance I1 by the control of the processing circuit 30 in steps S12 and S15 of FIG. 5. At this time, when the irradiance I1 is equal to or more than the threshold value R0, the alarm unit 50 issues an alarm sound and issues an alarm in such a manner that the display unit 40 blinks. As a mode in which the display unit 40 continuously displays the degree of risk D corresponding to the maximum value of the irradiance I1, when the display unit 40 is a level meter, a mode is considered in which only a light emitting element of the level meter corresponding to the maximum degree of risk D is turned on and is not turned off. Further, when the display unit 40 is a liquid crystal panel, a mode is considered in which the numerical value indicating the maximum degree of risk D continues to be displayed.

In step S6 of the main process, the communication module 70 transmits various data to the external storage means such as the cloud 3 or the terminal device 4, the various data indicating the irradiance I1 at each point of time, the degree of risk D, the maximum value of the irradiance I1, the maximum degree of risk D corresponding to the maximum value of the irradiance I1, and whether there is a risk state in which the maximum degree of risk D is equal to or more than the reference value R1.

Hereinafter, the maximum value recording process will be described with reference to FIG. 6. In the maximum value recording process of FIG. 6, for example, while the power switch 61 is switched "on", processes of steps S22 to S24 are repeatedly executed.

Figure 6:
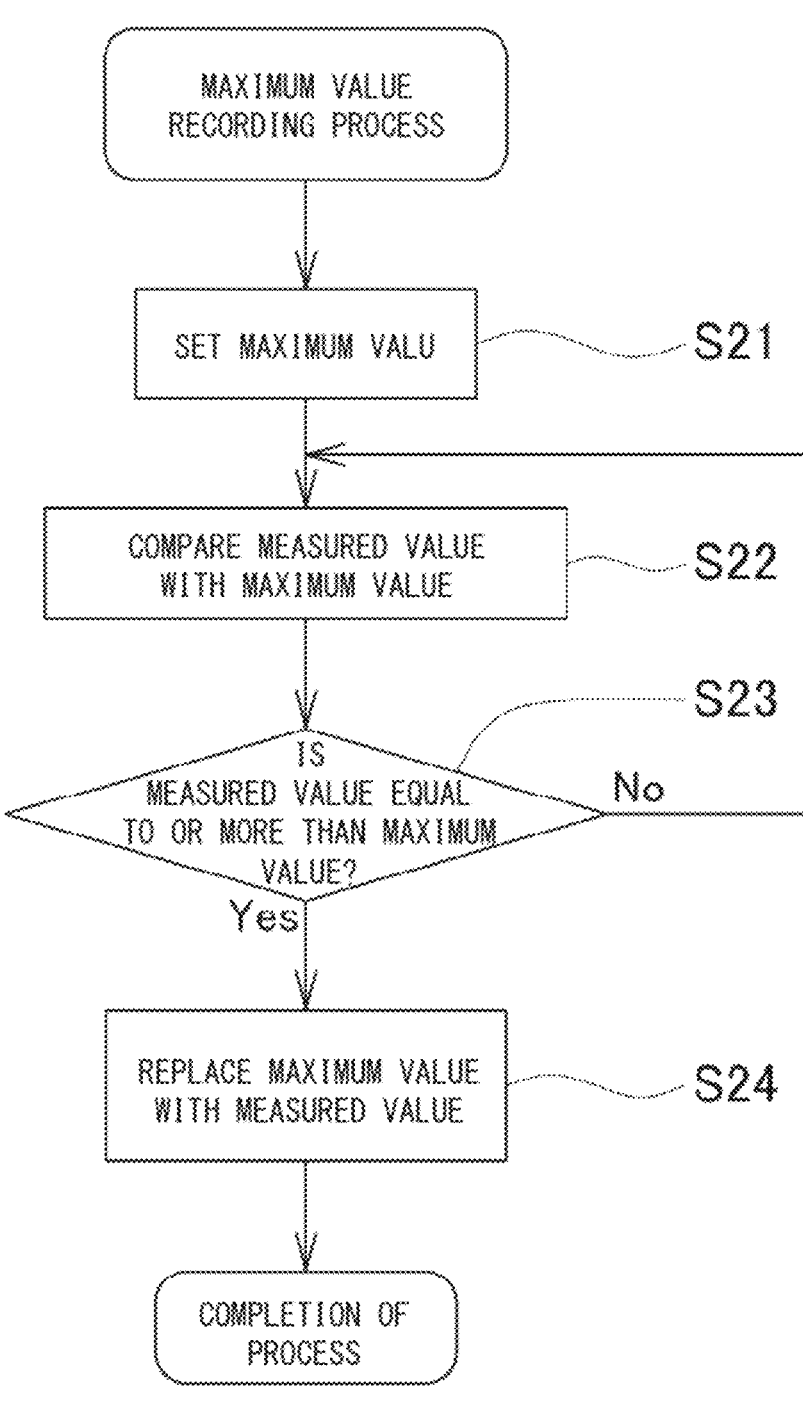
FIG. 6 is a flowchart showing a maximum value recording process in the laser scattered light measuring device according to the embodiment of the present invention.

In step S21 of the maximum value recording process shown in FIG. 6, the maximum value of the irradiance I1 is set to an initial value "0" as part of the initialization process in step S1 of FIG. 4.

In step S22 of the maximum value recording process shown in FIG. 6, the processing circuit 30 calculates the irradiance I1 at each time point and compares the calculated irradiance with the maximum value, and it is determined in step S23 whether the irradiance I1 is equal to or more than the maximum value. When the irradiance I1 is equal to or more than the maximum value (Yes), the process proceeds to step S24, and when the irradiance I1 is less than the maximum value (No), the process returns to step S22.

In step S24 of the maximum value recording process shown in FIG. 6, the processing circuit 30 controls the storage device 31 to store the irradiance I1, which is determined to be equal to or more than the maximum value at that time, as a new maximum value. Since the irradiance I1 is stored in the storage device 31 as the new maximum value at that time, the maximum value can be rewritten.

As described above with reference to FIGS. 1 to 6, according to the laser scattered light measuring device of the embodiment, the light receiving unit 10 detects the intensity of the laser scattered light L1 generated when the object is irradiated with the laser light L0, the processing circuit 30 compares the intensity of the laser scattered light L1 received by the light receiving unit 10 with the threshold value R0 and calculates the degree of risk D of the laser scattered light L1 to the human body based on the comparison result, and the display unit 40 displays the degree of risk D calculated by the processing circuit 30.

Therefore, it is possible to detect the intensity of the laser scattered light L1 by directing the light receiving unit 10 at the position where the most powerful laser scattered light L1 is considered to be generated under an environment where the high-power laser device 1 having a high risk to the human body is used, and to calculate and display the degree of risk D. As a result, an appropriate distance is taken from the generation position of the laser scattered light L1, or an appropriate shield is installed between a person and the generation position of the laser scattered light L1, and thus the safety of the laser scattered light on the human body can be easily secured in situations such as securing an area where a person can safely come and go.

Further, as described with reference to FIGS. 1 to 6, the laser scattered light measuring device of the embodiment further includes the laser pointer 20. Therefore, the laser pointer 20 points to the position where the most powerful laser scattered light L1 is considered to be generated, the light receiving unit 10 can be accurately directed to the position where the most powerful laser scattered light L1 is considered to be generated, the intensity of the laser scattered light L1 can be accurately detected, and the safety of the laser scattered light on the human body can be easily and accurately confirmed.

Further, as described with reference to FIGS. 1 to 6, according to the laser scattered light measuring device of the embodiment, when the degree of risk D is equal to or more than the reference value R1 determined based on the threshold value R, the alarm unit 50 issues the alarm sound. Therefore, for example, when the laser pointer 20 is used and the light receiving unit 10 is directed to the position where the most powerful laser scattered light L1 is considered to be generated, it can be known that the irradiance I1 of the laser scattered light L1 is equal to or more than the threshold value R determined, for example, according to the maximum permissible exposure, and the safety of the laser scattered light on the human body can be confirmed more easily.

Further, as described with reference to FIGS. 1 to 6, according to the laser scattered light measuring device of the embodiment, the maximum value of the degree of risk D is continuously displayed on the display unit 40 in the maximum value recording process until the power switch is switched off from on, for example. Therefore, for example, when the laser pointer 20 is used and the light receiving unit 10 is directed to the position where the most powerful laser scattered light L1 is considered to be generated, the maximum value of the degree of risk D can be confirmed at any time, and the safety of the laser scattered light on the human body can be confirmed more easily.

Further, as described with reference to FIGS. 1 to 6, according to the laser scattered light measuring device of the embodiment, the housing 3 of the measuring device is small enough to be held by one hand and includes the recess 3a having a shape that allows a finger to be hung when the measuring device is gripped with one hand. Therefore, for example, it is possible to simplify the work in which the laser pointer 20 points to the point where the most powerful laser scattered light L1 is generated, and the safety of the laser scattered light on the human body can be confirmed more easily.

Further, as described with reference to FIGS. 1 to 6, according to the laser scattered light measuring device of the embodiment, the light receiving unit 10 includes the light dimming unit 12 that adjusts the frequency component of the light transmitted through the lens 11 so as to selectively transmit the frequency component of the specific frequency band determined based on the wavelength of the laser light L0, which is irradiated to the object, for example, among the light transmitted through the lens 11. Therefore, the intensity of the laser scattered light L1, which is highly harmful to the human body, can be accurately detected, the degree of risk D can be calculated, and the safety of the laser scattered light on the human body can be confirmed more easily and accurately.

Further, as described with reference to FIGS. 1 to 6, according to the laser scattered light measuring device of the embodiment, the processing circuit 30 executes the ambient light detecting process for calibration, which is the zero point setting. Therefore, it is possible to eliminate the influence of ambient light such as indoor fluorescent lamp light and outdoor sunlight on the detection result in the light receiving unit 10, and the safety of the laser scattered light on the human body can be confirmed more easily and accurately.

Further, as described with reference to FIGS. 1 to 6, the laser scattered light measuring device of the embodiment further includes the communication module 70. Therefore, the communication module 70 can transmit various data to the external storage means such as the cloud 3 or the terminal device 4, the various data indicating the irradiance I1 at each point of time, the degree of risk D, the maximum value of the irradiance I1, the maximum degree of risk D corresponding to the maximum value of the irradiance I1, and whether there is a risk state in which the maximum degree of risk D is equal to or more than the reference value R1, various data can be shared among related parties and be stored for a long period of time, the safety of the laser scattered light to the human body can be easily confirmed at a remote location other than the measurement location of the laser scattered light L1, and the information on the safety of the laser scattered light to the human body can be used more effectively.

The embodiment of the present invention has been described above with reference to the drawings (FIGS. 1 to 6). However, the present invention is not limited to the above-described embodiment, and can be implemented in various aspect without departing from the gist of the present invention (for example, (1) to (4) below).

(1) In the embodiment, the reference value R1 corresponds to the degree of risk D of the value "10", and the alarm unit 50 issues the alarm sound when the ratio of the irradiance I1 to the threshold value R0 is 100% or more. The present invention is not limited thereto, the reference value R1 can be set to correspond to the degree of risk D smaller than the value "10". Further, the processing circuit 30 can also control the alarm unit 50 so as to change the pitch, height, size of the alarm sound according to the value of the degree of risk D.

(2) In the embodiment, the degree of risk D is represented by numerical values of 10 levels. However, the degree of risk D may be represented by numerical values larger than 10 levels or numerical values smaller than 10 levels as long as being calculated based on the ratio of the irradiance I1 to the threshold value R0, and when the display unit 40 is a level meter, the number of segments can also be set according to the number of levels of the degree of risk D. Further, the range of the ratio corresponding to each value of the degree of risk D does not have to be constant. For example, the range of the ratio corresponding to each value of the degree of risk D can be changed such that the difference between the upper and lower limits becomes smaller as the value of the degree of risk D becomes larger. Further, the range of the ratio corresponding to each value of the degree of risk D can be changed such that the difference between the upper and lower limits becomes larger as the value of the degree of risk D becomes larger.

(3) In the embodiment, the size of the housing 3 is set to be a size enough to be held by one hand in order to facilitate the handling of the measuring device, but the present invention is not limited thereto. The size of the housing 3 may be larger than the size enough to be held by one hand, and may be designed to be used by supporting the measuring device with a dedicated leg.

(4) In the embodiment, the laser device 1 is the CW-YAG laser, and the wavelength of the laser light L0 is 1064 nm, but the present invention is not limited thereto. Various lasers can be used for the laser device 1. Further, the light dimming unit 12 corresponds to the wavelength of the laser light L0 of 1064 nm, but a bandpass filter corresponding to wavelengths of various lasers can be adopted as the light dimming unit 12, whereby the threshold value R0 can be set according to wavelengths of various lasers.

REFERENCE SIGNS LIST

L0 laser light
L1 laser scattered light
LR lower limit ratio
R0 threshold value
R1 reference value
V1 light intensity signal
2 workpiece (object)
10 light receiving unit
11 lens
12 light dimming unit
13 light sensor
20 laser pointer
30 processing circuit (arithmetic calculation unit)
40 display unit
50 alarm unit
60 operation unit

What is claimed is:

1. A laser scattered light measuring device comprising:
a light receiving unit that receives laser scattered light generated by irradiating an object with laser light and detects intensity of the laser scattered light;
a calculation unit coupled to the light detecting unit so as to compare the intensity of the laser scattered light detected by the light receiving unit with a predetermined threshold value and calculates a degree of risk of the laser scattered light to a human body based on a comparison result;
a display unit coupled to the calculation unit so as to display the degree of risk calculated by the calculation unit;
a laser pointer that points to a generation position in the object of the laser scattered light wherein the light receiving unit is directed by the laser pointer to the position where the laser scattered light is generated wherein the intensity of the laser scattered light is detected by the light receiving unit;
an alarm unit that issues an alarm sound when the degree of risk is equal to or more than a reference value determined based on the threshold value; and
wherein the light receiving unit includes a lens that concentrates the laser scattered light, a light dimming unit that adjusts a frequency component of light transmitting through the lens to selectively transmit a wavelength of the laser light, and a light sensor that outputs a light intensity signal corresponding to intensity of light transmitting through the light dimming unit to the calculation unit.

2. The laser scattered light measuring device according to claim 1, further comprising
maximum value recording means that records a maximum value of the intensity of the laser scattered light detected by the light receiving unit,
wherein the display unit displays a change in the degree of risk in real time and continuously displays the degree of risk corresponding to the maximum value.

3. The laser scattered light measuring device according to claim 1, further comprising maximum value recording means that records a maximum value of the intensity of the laser scattered light detected by the light receiving unit,
wherein the display unit displays a change in the degree of risk in real time and continuously displays the degree of risk corresponding to the maximum value.

4. The laser scattered light measuring device according to claim 1, wherein the device is a handheld device.

5. A laser scattered light measuring device comprising:
a light receiving unit that receives laser scattered light generated by irradiating an object with laser light and detects intensity of the laser scattered light;
a calculation unit coupled to the light detecting unit so as to compare the intensity of the laser scattered light detected by the light receiving unit with a predetermined threshold value and calculates a degree of risk of the laser scattered light to a human body based on a comparison result;
a display unit coupled to the calculation unit so as to display the degree of risk calculated by the calculation unit;
an alarm unit that issues an alarm sound when the degree of risk is equal to or more than a reference value determined based on the threshold value; and
wherein the light receiving unit includes a lens that concentrates the laser scattered light, a light dimming unit that adjusts a frequency component of light transmitting through the lens to selectively transmit a wavelength of the laser light, and a light sensor that outputs a light intensity signal corresponding to intensity of light transmitting through the light dimming unit to the calculation unit.

6. The laser scattered light measuring device according to claim 5, further comprising
maximum value recording means that records a maximum value of the intensity of the laser scattered light detected by the light receiving unit,
wherein the display unit displays a change in the degree of risk in real time and continuously displays the degree of risk corresponding to the maximum value.

7. The laser scattered light measuring device according claim 5, wherein the light receiving unit further comprises a lens that focuses the laser scattered light entering through a light receiving opening, wherein a diameter of the light receiving opening conforms to Annex 'A.2 Limiting aperture' of JIS standard C6802.

8. The laser scattered light measuring device according to claim 7, wherein the diameter of the light receiving opening is 7 mm.

9. The laser scattered light measuring device according to claim 5, wherein irradiating an object with laser light comprises welding, cutting and drilling the object and wherein the object comprises a metal material.

10. The laser scattered light measuring device according to claim 5, wherein irradiating an object with laser light comprises irradiating a workpiece and wherein the workpiece comprises a metal material.

11. The laser scattered light measuring device according to claim 5, wherein the device is a handheld device.

12. The laser scattered light measuring device according to claim 5, further comprising
a laser pointer that points to a generation position in the object of the laser scattered light wherein the light receiving unit is directed by the laser pointer to the position where the laser scattered light is generated wherein the intensity of the laser scattered light is accurately detected by the light receiving unit.

13. The laser scattered light measuring device according to claim 12, further comprising a housing wherein the housing comprises the light receiving unit, the laser pointer and the display unit wherein the housing is a size to be held by one hand wherein the device is a handheld device.

* * * * *